Feb. 13, 1934.   F. C. WILSON   1,947,178
INTERLOCKING WHEEL
Filed July 11, 1932
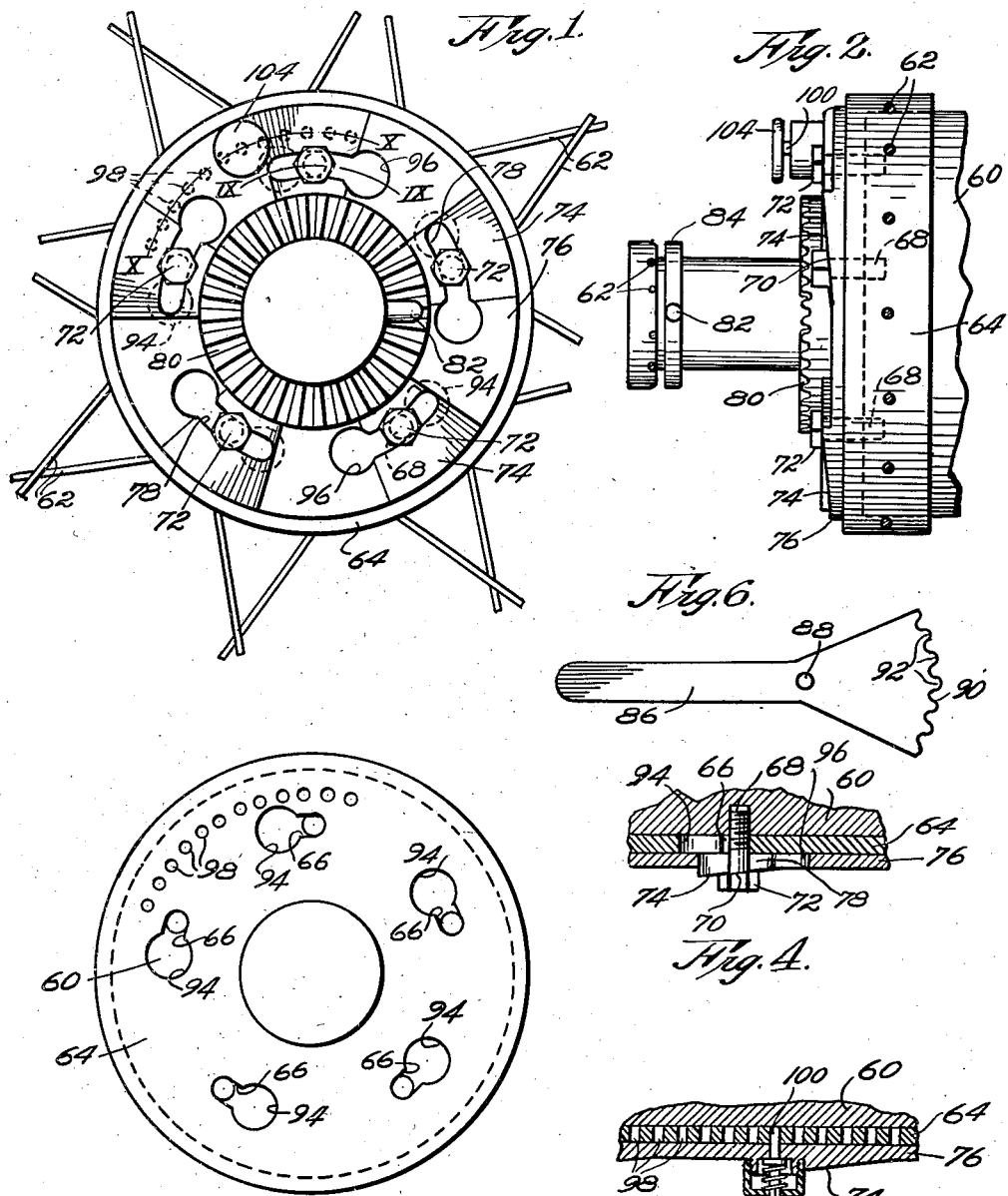
INVENTOR,
Francis Condry Wilson.
BY
Hovey & Hamilton,
ATTORNEYS.

Patented Feb. 13, 1934

1,947,178

UNITED STATES PATENT OFFICE 1,947,178

INTERLOCKING WHEEL

Francis Condry Wilson, North Kansas City, Mo.

Application July 11, 1932. Serial No. 621,881

12 Claims. (Cl. 301—9)

This invention relates to wheel construction and has particular reference to an interlocking assembly especially adaptable for use in constructing automobile wheels wherein it is desired to incorporate means for quickly and easily changing the tire by removal of the entire wheel unit.

The primary object of this invention is the provision of means for accomplishing the above results, which is not only cheap to manufacture and effective in operation, but is strong, durable, not likely to get out of order, and has a pleasing appearance that does not detract in any manner from the desirable neat appearance of an automobile wheel.

A yet further aim of this invention is to provide means for quickly mounting and demounting the wheel of an automobile, whether the same be of the wire spoke, disk or artillery type.

A still further object of the invention is to provide in a wheel assembly of the character just set forth, members and parts for carrying out the broad concepts of the invention, which parts, as well as minor objects of the invention, will be set forth in detail during the following specification referring to the accompanying drawing, wherein one form of the invention is illustrated:

Fig. 1 is a fragmentary, side elevation of a wire spoke wheel having interlocking parts embodying this invention and made in accordance with one of the modifications thereof. The outer set of spokes not being shown.

Fig. 2 is a broken, side elevation of the assembly shown in Fig. 1.

Fig. 3 is a face view of the shell only, showing relative position of the openings formed therethrough.

Fig. 4 is an enlarged, fragmentary, detailed, sectional view taken on line IX—IX of Fig. 1.

Fig. 5 is a similar view taken along the arcuate line X—X of Fig. 1, and,

Fig. 6 illustrates one form of a tool designed to operate the parts shown in Figs. 1 to 5 inclusive.

This invention contemplates a wheel assembly that will not be subject to the ordinary objections which are directed against the well known automobile wheel construction, in that mounting and demounting a tire in case of emergency or otherwise, may be accomplished without the troublesome necessity of removing a large number of bolts, and without the use of tools other than the special one contemplated by this invention. Many forms of structures might be made to embody the instant invention, and with this possibility in mind only the form shown in the drawing will be described minutely.

As is customary, the axle attachment 60 carries the entire wheel, and in this instance, part of the wire spokes 62 are affixed to a shell 64, having an inturned annular flange as shown, and having the face thereof pierced to create a series of slots 66, arranged in a circular path concentric with the center of said shell 64 so that a number of bolts 68, rigidly carried by axle attachment 60, will pass therethrough as clearly shown in Fig. 4. It is desirable to securely anchor all bolts 68 in position so that the lower inclined face 70 of the heads 72 thereof will be disposed in the proper direction to lie against inclined faces 74 formed on plate 76, which lies against the face of shell 64 when the parts are assembled. Bolts 68 pass through a series of slots 78, formed through plate 76, as shown in Fig. 1, and because of the relationship between inclined faces 74 and the respective inclined face 70 of each bolt 72, a turning of plate 76 about its center will cause a tightening effect between bolts, plate and shell 68, 76 and 64 respectively.

As indicated in the drawing, bolts 68, slots 66, and slots 78 are all concentrically arranged and positioned an equal distance from the common center of the entire wheel assembly. To force plate 76 about this center there is provided an arcuate or annular rack 80 that is formed on the outer face of plate 76 between the path of bolts 68 and the wheel center. Adjacent rack 80 is disposed a pintle 82, rigidly secured to a portion of shell 64 by collar 84. The outer group of wire spokes 62 are secured to the same portion of shell 64, as shown in Fig. 2. The invention includes the use of an unique tool 86 which is used to engage rack 80 for the purpose of forcing plate 76 around beneath bolt heads 72. This tool 86 has a hole 88 therethrough at the radial center of the arcuate face 90 which is provided with a series of teeth 92 for the purpose of engaging teeth in rack 80. It is but necessary to move tool 86 to position on pintle 82 with teeth 92 in engagement with rack 80 when it is necessary or desirable to rotate plate 76 for the purpose of tightening or loosening the entire wheel assembly. Slots 66, formed through shell 64, have enlarged portions 94, and slots 78 formed through plate 76 have similarly enlarged portions 96, through which may pass heads 72 of bolts 68 when plate and shell are being moved to and from association with axle attachment 60.

Means is also provided in this form of the invention for positively locking together plate 76 and cap 64 so that relative axial movement is precluded. This means includes an arcuate series of openings 98 formed through shell 64 in an arcuate path so that one of said openings 98 may always be engaged by plunger 100 of the manually operable locking structure shown in Fig. 5.

Plunger 100 is held in the locking position by coil spring 102 and when it is desired to loosen plate 76, plunger 100 is simply drawn outwardly by withdrawing head 104 of plunger 100 to the point where the inner end thereof is no longer in one of holes 98.

The relation of parts in the form just described is such that they will not only positively maintain themselves against relative displacement, but may be quickly loosened, whereby the entire wheel may be replaced in an exceptionally short length of time.

Many modifications of the invention other than that here shown and described are possible in practicing the invention, and while the parts of a wheel assembly embodying the invention might be made of various materials and to present various sizes and shapes, it is understood that all such deviations from specific construction might be made without departing from the spirit of the invention or scope of the appended claims.

Having thus described the invention, what is claimed as new and desired to be secured by Letters Patent is:

1. In a wheel assembly of the character described, an axle attachment; a slotted shell removably carried by the attachment; a bolt through each slot respectively and entering said axle attachment; a locking plate, having inclined faces underlying the heads of said bolts; and an annular rack formed on the face of said plate whereby force is imparted to said plate to move the inclined faces along beneath said bolt heads, said slots being disposed in an annular path concentric with the annular rack and circumscribing the same.

2. In a wheel assembly of the character described, an axle attachment; a plurality of bolts carried thereby and disposed in an annular path; a shell against said axle attachment; a locking plate, having arcuate slots for receiving said bolts; an inclined face formed on the plate around each slot respectively; an annular rack formed on the face of said plate; and a manually releasable lock for securing said plate and shell against relative movement.

3. In a wheel assembly of the character described, an axle attachment; a plurality of bolts carried thereby and disposed in an annular path; a shell against said axle attachment; a locking plate, having arcuate slots for receiving said bolts; an inclined face formed on the plate around each slot respectively; an annular rack formed on the face of said plate; and a manually releasable lock for securing said plate and shell against relative movement; the annular path of the bolts circumscribing the annular rack and being concentric therewith.

4. In a wheel assembly of the character described; an axle attachment; a plurality of spaced-apart bolts carried thereby and disposed in an annular path; a shell against said axle attachment and carrying the spokes of said wheel; a series of arcuate slots formed through said shell to receive said bolts; a locking plate, having a plurality of arcuate slots for receiving said bolts; an inclined face formed on the plate around each slot of the locking plate respectively; a series of holes formed through the shell; a locking structure carried by the plate and having a plunger for entering one of said holes of the series to lock together said shell and plate; and an arcuate rack formed on the face of said plate.

5. In a wheel assembly of the character described; an axle attachment; a plurality of spaced-apart bolts carried thereby and disposed in an annular path; a shell against said axle attachment and carrying the spokes of said wheel; a series of arcuate slots formed through said shell to receive said bolts; a locking plate, having a plurality of arcuate slots for receiving said bolts; an inclined face formed on the plate around each slot respectively; a series of holes formed through the shell; a locking structure carried by the plate and having a plunger for entering one of said holes of the series to lock together said shell and plate; and an annular rack formed on the face of said plate; said slots of both shell and plate having an enlarged portion to permit the passage of the bolt head therethrough whereby the wheel is mounted and tightened without removal of said bolts.

6. In a wheel assembly of the character described having an axle attachment, a shell mounted on the attachment, a locking plate movable with respect to the axle attachment and shell to secure the latter in place on the former, and an annular rack integral with the said locking plate, a tool support comprising a pintle positioned axially outward and opposite to said rack for pivotally holding a plate-engaging tool.

7. In a wheel assembly of the character described having an axle attachment, a shell mounted on the attachment with an integral projection extending laterally therefrom, a ring-shaped plate circumscribing said projection movable to secure the shell in place on the axle attachment, and a rack formed on the plate, a tool support carried by the projection comprising a pintle positioned axially outward of said rack for pivotally holding a plate-engaging tool.

8. In a wheel assembly of the character described, an axle attachment; a plurality of headed bolts carried by said attachment and arranged in an annular path on the face thereof; a shell having a series of arcuate slots formed therethrough for engaging said bolts; and a locking plate having a series of arcuate slots formed therethrough for also engaging said bolts, the slots of both shell and plate being in overlapping relation and having a width equal to the diameter of the bolt passing therethrough, the slots of both cap and locking plate being in the same annular path as the said headed bolts and each having an enlarged portion large enough to permit the passage of the heads of the bolts therethrough, the enlarged portions of overlapping slots being on opposite sides of the bolt passing therethrough.

9. A wheel assembly of the character described comprising, in combination, a shell; members relatively stationary with respect to said shell during the wheel mounting operation; a locking element movable through an annular path for securing together said shell and the relatively stationary members; an annular rack formed on the locking element; and an arcuate series of locking holes formed in the shell, said annular rack and annular path of travel of the locking element being concentric, the latter circumscribing the former.

10. A wheel assembly of the character described comprising, in combination, a shell; members relatively stationary with respect to said shell during the wheel mounting operation; a locking element movable through an annular path for securing together said shell and the relatively stationary members; an arcuate rack formed on the locking element; a structure mounted upon the said locking element for securing together the shell and said locking element; and an arcuate series of locking holes formed in the shell, one of the holes of the series being engaged by said securing structure, said structure comprising a housing in screwthreaded engagement with the locking element, a headed, manually movable plunger to enter any one of said holes of the arcuate series, and a spring within the housing to urge the said plunger toward a hole-engaging position.

11. A wheel assembly of the character described comprising, in combination, a shell; an axle attachment relatively stationary with respect to said shell during the wheel mounting operation; a disk-shaped locking plate rotatable upon its axis for securing together said shell and the axle attachment; an arcuate rack formed on the locking plate; a structure mounted upon said plate for securing together the said shell and said plate; an arcuate series of locking holes formed in the shell and underlying said plate, one of the holes of the series being engaged by said securing structure.

12. A wheel assembly of the character described comprising, in combination, a shell; an axle attachment relatively stationary with respect to said shell during the wheel mounting operation; a disk-shaped locking plate rotatable upon its axis; an annular rack formed on the locking plate; a structure mounted upon said locking plate for securing together said shell and plate; an arcuate series of locking holes formed in said shell, one of the holes of the series being engaged by said locking structure; and means supported by the shell during the mounting or demounting operation for engaging the said annular rack on the locking plate to move the latter about its axis.

FRANCIS CONDRY WILSON.